United States Patent

[11] 3,559,925

[72] Inventors Francis Joseph Costigan
Henlow;
Charles William May, St. Albans, England
[21] Appl. No. 754,000
[22] Filed Aug. 20, 1968
[45] Patented Feb. 2, 1971
[73] Assignee Hawker Siddeley Dynamics Limited
Hatfield, Hertfordshire, England
a British Company
[32] Priority Aug. 24, 1967
[33] Great Britain
[31] 39,028/67

[54] UNDERCARRIAGES
7 Claims, 4 Drawing Figs.
[52] U.S. Cl. .................................................... 244/50,
244/104
[51] Int. Cl. .................................................... B64c 25/50,
B64c 25/58
[50] Field of Search .......................................... 244/50,
100, 102, 103, 104

[56] References Cited
UNITED STATES PATENTS

| | | | |
|---|---|---|---|
| 2,490,485 | 12/1949 | Spaeth.......................... | 244/102 |
| 2,535,167 | 12/1950 | Smith et al..................... | 244/50 |
| 2,543,233 | 2/1951 | Dowty........................... | 244/50 |
| 2,747,817 | 5/1956 | Saulnier......................... | 244/50 |
| 3,091,416 | 5/1963 | Knights et al.................. | 244/50 |
| 3,188,023 | 6/1965 | Dowty et al.................... | 244/50 |
| 3,211,400 | 10/1965 | Booth............................ | 244/50 |

*Primary Examiner*—Milton Buchler
*Assistant Examiner*—Paul E. Sauberer
*Attorney*—Dowell and Dowell ABSTRACT: In main undercarriage gear for an aircraft, in which the wheels are in two pairs in tandem, one pair being forward of the lower end of the main undercarriage strut and the other pair being rearward, a configuration is provided to enable either one, or both, pairs of wheels to castor when the aircraft is taxiing so as to avoid tire scrub. The pair of wheels which is to castor is mounted in trailing configuration on the subsidiary leg which is itself carried on the main strut by means of a parallel linkage so that it can rise and fall with respect to the main strut. The wheel pair castors about the vertical axis of this subsidiary leg.

UNDERCARRIAGES

To ensure that the castoring wheel pair is centered for retraction when the undercarriage is not under load, the subsidiary leg is provided with a combined hop damper and centering unit. The leg is telescopic and its inner and outer members are respectively connected to a piston and cooperating cylinder of the hop damper; and the centering device consists of face cams, one secured to the cylinder and the other to the damper piston, which are drawn apart from one another when the leg is unloaded but come together under spring force and center the wheels when there is no load on the leg.

DESCRIPTION OF INVENTION

This invention relates to aircraft landing wheel suspension.

The main landing gear of modern aircraft normally comprises four wheels arranged in tandem. Such an arrangement leads to scrubbing of the tyres on the ground when the aircraft turns on an arc of small radius giving rise to undesirable loading of the components of the suspension.

This problem is overcome in a tandem suspension in accordance with the invention in which at least one, and possibly both, pairs of wheels are mounted for full castoring i.e. the vertical axis of rotation of the wheels is in advance of the horizontal axis of rotation in the direction of normal forward movement of the aircraft. This means that if say, the leading pair of wheels are fully castoring then the aircraft can pivot about the trailing pair without any appreciable tyre scrub. The vertical pivot for either or both pairs of wheels, can be provided by a rod or tube extending vertically from the horizontal axis trunnion and rotatable within a fixed tube connected by pivotal link(s) to the main strut of the suspension.

A self-centering cam arrangement will normally be provided to ensure that the wheels when unloaded are positioned fore and aft for retraction into the aircraft. Such an arrangement may comprise two half cams one connected to the rotatable pin or tube and one to a fixed part the half cams being biased together to center the wheels but separating when the wheels are subjected to load.

An embodiment of a suspension in accordance with the invention will now be described with reference to the accompanying diagrammatic drawings in which.

Figure 1:
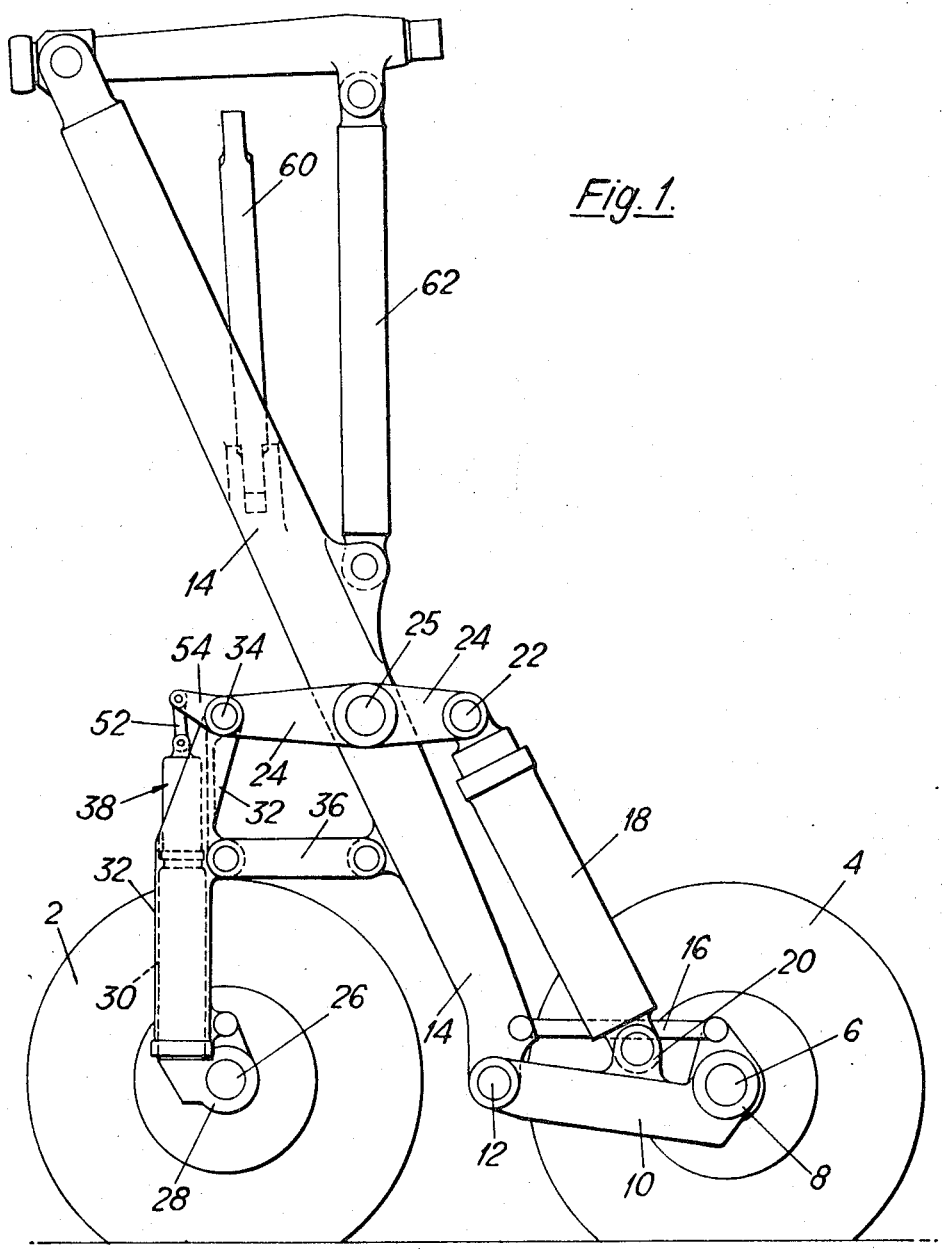
FIG. 1 is a side elevation of the suspension.
Figure 2:
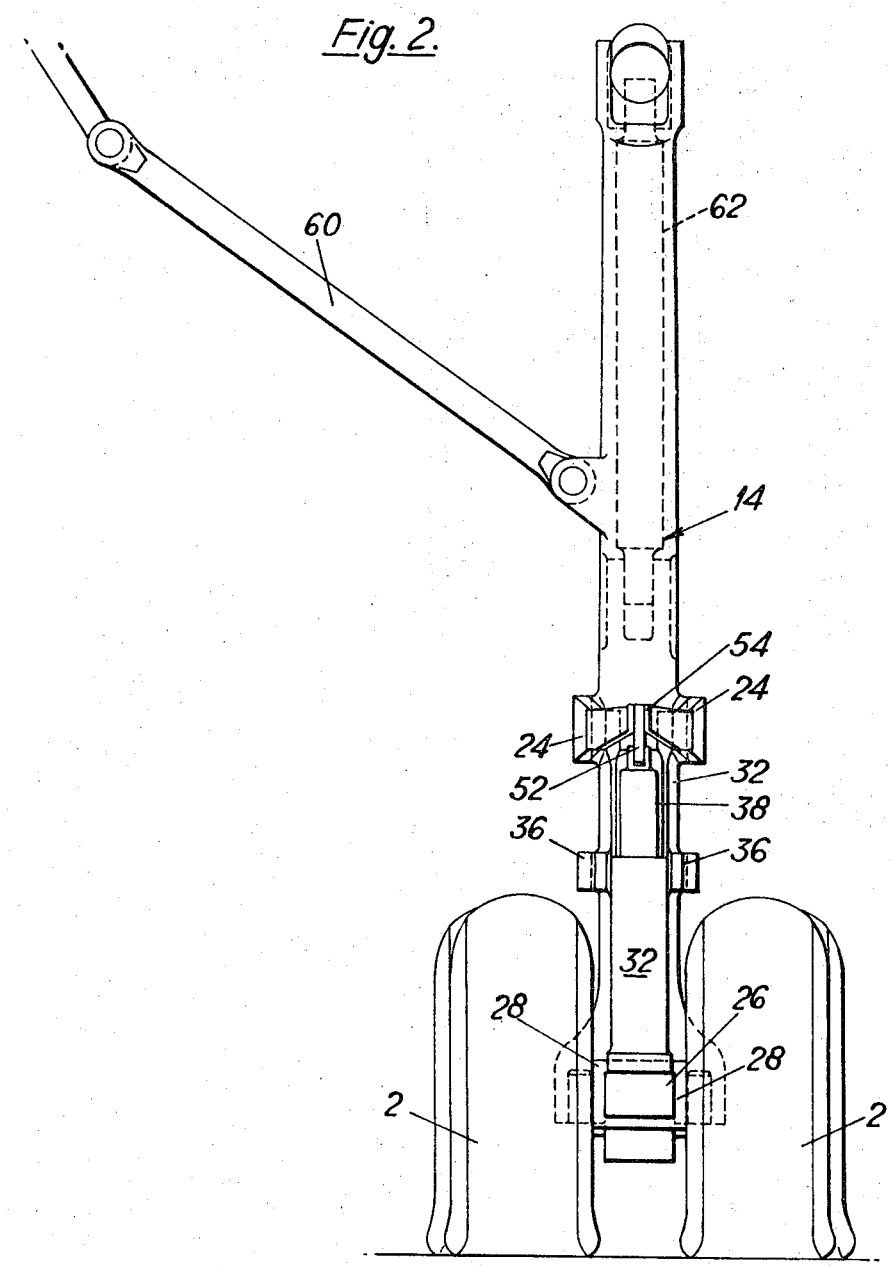
FIG. 2 is a corresponding end elevation.
Figure 3:
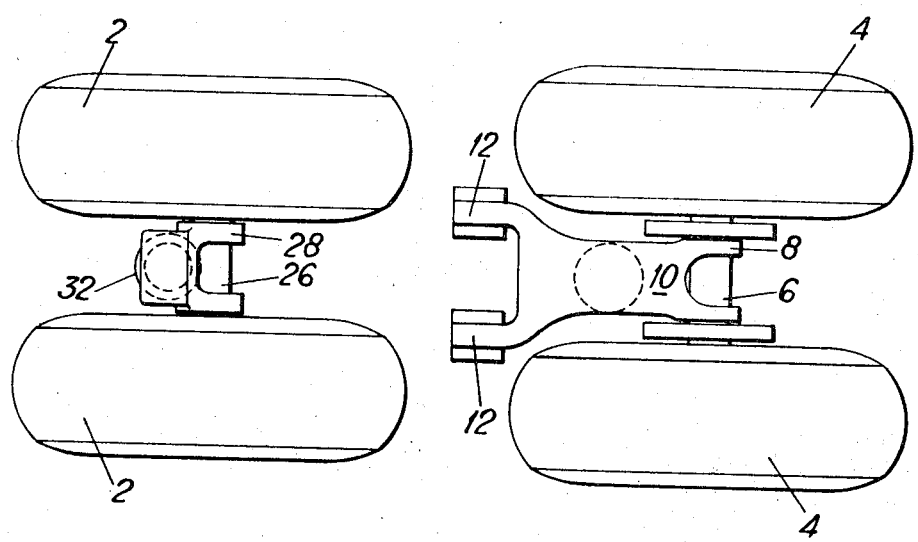
FIG. 3 is an underneath plan.

The aircraft suspension illustrated in the drawings comprises two pairs of wheels 2,4 arranged in tandem, the trailing pair 4 being mounted on an axle 6 carried by a trunnion 8 at one end of an axle beam 10 the other end of which is pivoted at 12 to the lower end of the main strut 14 of the suspension. A parallel link 16 located above the beam 10 also connects the axle to the main strut as in conventional design.

Vertical movement of the axle beam 10 is controlled by an oleo-pneumatic shock absorber 18 connected to a lug 20 on the beam 10 and to a pivot 22 connecting the trailing ends of a pair of arms 24 which embrace and are pivoted at 25 between their ends to the main strut 14.

The axle 26 of the leading pair of wheels 2 is carried by trailing wheel-carrier 28 secured to the lower end of the inner sliding member 30 of a telescopic subsidiary leg which is substantially vertical when the undercarriage is down during landing and take off and the outer member of which is a tube 32 of circular cross section within which the member 30 is freely rotatable and the upper end of which is pivotally connected at 34 to the leading ends of the pair of arms 24. The tube 32 is also connected to the main strut by a pair of pivoted links 36 which are parallel to the arms 24.

As the wheel-carrier 28 will engage the lower end of the tube 32 when subjected to high landing loads, such loads are transmitted via the arms 24 to the main shock absorber 18.

As the sliding member 30 can pivot in the leg tube 32 and as the vertical axis of the leg is in advance of the horizontal axis of the wheels 2, it will be appreciated that the arrangement enables the leading pair of wheels freely to castor through 360°.

In order to enable the leading pair of wheels to be retracted into the aircraft it is necessary for these to resume their normal fore and aft position and a combined centering cam and hop damper device generally indicated at 38 in FIG. 1 is provided. This device is shown in detail in FIG. 4.

The centering cam is formed in two mating halves 40,42 the upper half 40 being secured to a damper piston 44 which is connected to the upper end of the inner leg 30 member by means of a universal joint 46. The piston passes through the lower half cam 42 which has its periphery secured to the inner surface of the damper cylinder 48 surrounding the head 50 of the piston and located within the broken-away upper portion of the leg tube 32. The damper cylinder is connected by a pivotal link 52 to a cross lever 54 connected at 34 to the arms 24 to hold the cylinder in position and to prevent it from turning when the leg member 30 and damper piston 44 rotate.

A spring 56 is interposed between the upper half cam and the under face of the head of the cylinder 48 and acts to urge the two half cams together.

Figure 4:
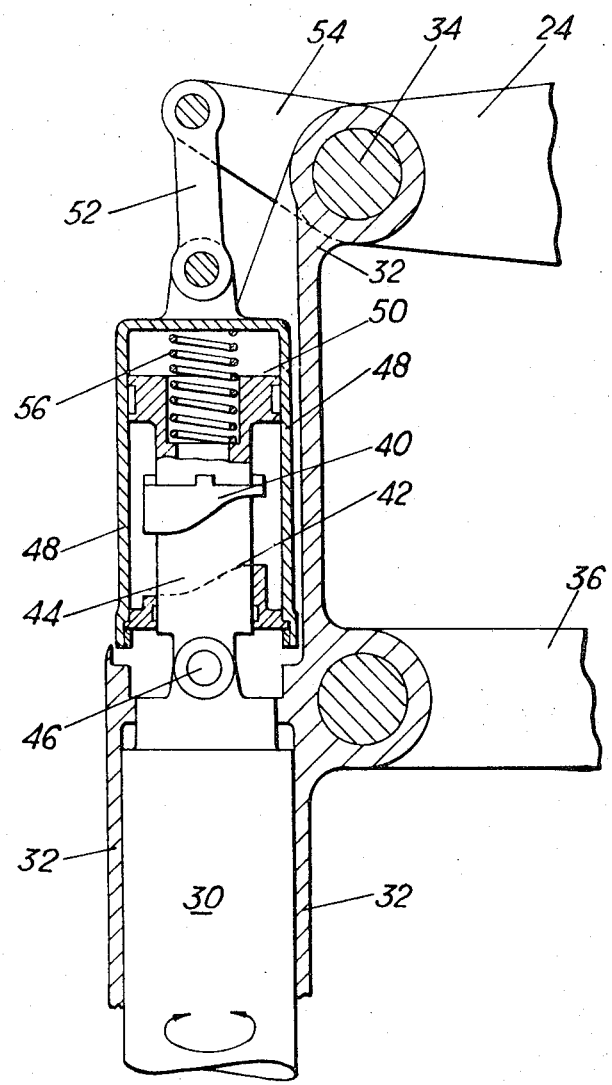
FIG. 4 is a detail of the front pivot and centering cam device.

In the position shown in FIG. 4 with the wheels under load and the cams separated, the inner leg member 30 and hence the axle for the leading pair of wheels can freely turn or castor through 360° but when the wheels are lifted from the ground and are no longer loaded, the cam 40 is moved downwardly in the cylinder 48 by the spring 56 until it engages the fixed cam 42 and due to the shape of forces the cams, the piston and leg member 30 to turn until the wheels are locked in the fore and aft position ready for retraction.

The head 50 of the piston works in the hydraulic cylinder 48 to form a hop damper.

If it is desired that the trailing pair of wheels castor and not the leading pair, then the suspension is reversed i.e. the trailer wheels are provided with the subsidiary leg arrangement 30,32 and with the combined hop damper and centering cam and the leading pair with the horizontally extending axle beam 10 and main shock absorber 18.

Further a subsidiary leg together with a centering cam and shock absorber unit similar to that illustrated in the drawings for the leading wheels could be provided for both pairs of wheels so that all wheels are fully castoring.

The suspension described is connected to the aircraft in a conventional manner through the main strut 14 and subsidiary struts 60,62.

We claim:

1. Aircraft landing gear comprising, in combination: a main strut which depends from aircraft main structure when the landing gear is lowered for use, a first pair of ground wheels disposed forward of the lower end of said main strut, with first ground wheel mounting means pivotally connected to and forwardly extending from a lower portion of said main strut and upon which said first pair of groundwheels is mounted for rising and falling relatively to said main strut, and a second pair of groundwheels disposed rearward of the lower end of said main strut and in tandem with said first pair of groundwheels, with second groundwheel mounting means pivotally connected to and rearwardly extending from a lower portion of said main strut and upon which said second pair of groundwheels is mounted for rising and falling relatively to said main strut, and wherein at least one of said first and second groundwheel mounting means includes a subsidiary leg disposed with its axis substantially vertical during landing, fore-and-aft extending attachment means attaching said subsidiary leg to said main strut, a trailing wheel-carrier mounted at the lower end of said subsidiary leg for turning about said subsidiary leg axis, and a wheel-mounting axle for the respective pair of groundwheels which wheel-mounting axle is carried by said wheel-carrier at a position which is rearward of said subsidiary leg axis when the respective pair of groundwheels is in a fore-and-aft centered orientation for straight ahead movement, said respective pair of groundwheels thereby being enabled to turn in a fully castoring manner about said subsidiary leg axis.

2. Landing gear according to claim 1, wherein said subsidiary leg is a telescopic leg having an outer tube carried by said attachment means and an inner member slidable and rotatable in said outer tube and to the lower end of which said trailing wheel-carrier is secured.

3. Landing gear according to claim 2, further comprising automatic centering means coupled between said inner leg member and said outer tube to return said inner leg member and said trailing wheel-carrier and wheel pair carried thereby to the fore-and-aft centered orientation when said leg is unloaded.

4. Landing gear according to claim 3, wherein said automatic centering means comprises a pair of mating face cams one of which is nonrotary while the other is coupled to both rotate and slide with said inner leg member, and spring means urging said face cams axially into engagement, said face cams being moved out of engagement against the action of said spring means when sliding of said inner leg member relative to said outer leg tube takes place upon the leg coming under load.

5. Landing gear according to claim 4, further including a hop damper comprising a nonrotary cylinder attached to said outer leg tube, and a damper piston rotatable and slidable within said cylinder and coupled to the upper end of said inner leg member, said nonrotary face cam being secured to said cylinder and said rotary face cam being secured to said damper piston.

6. Landing gear according to claim 1, wherein said fore-and-aft extending attachment means for said subsidiary leg comprises a parallel linkage.

7. Landing gear according to claim 1, further comprising automatic centering means coupled between said subsidiary leg attachment means and said trailing wheel-carrier to return said trailing wheel-carrier and the respective pair of groundwheels thereon to the fore-and-aft centered orientation when said wheels are unloaded, and means rendering inoperative said automatic centering means when said wheels are under load.